(No Model.)
J. P. OUTCALT.
FEED CUTTER.
No. 349,661. Patented Sept. 21, 1886.
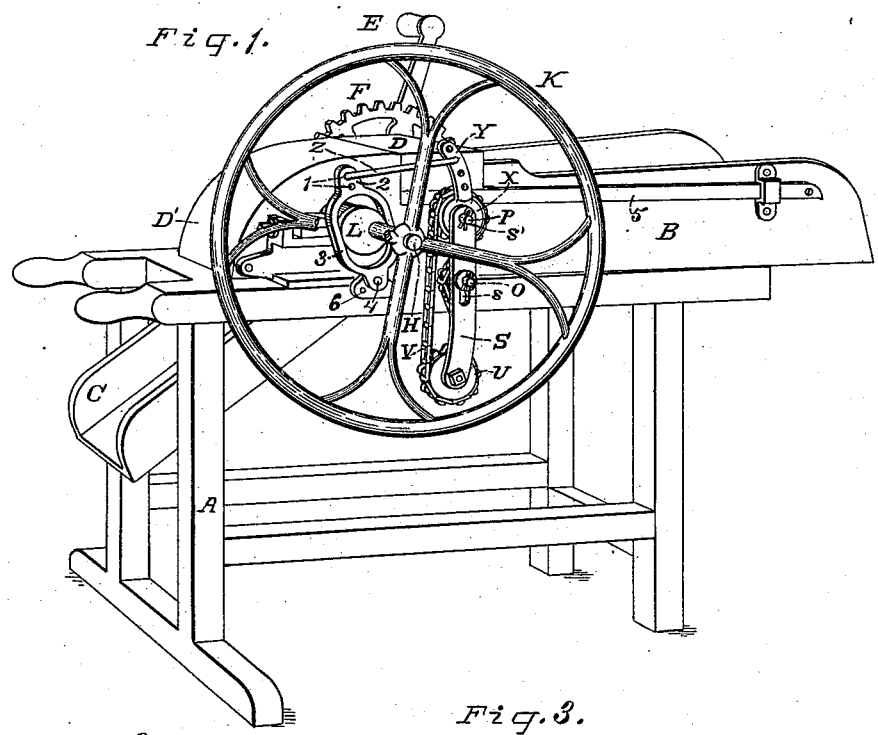
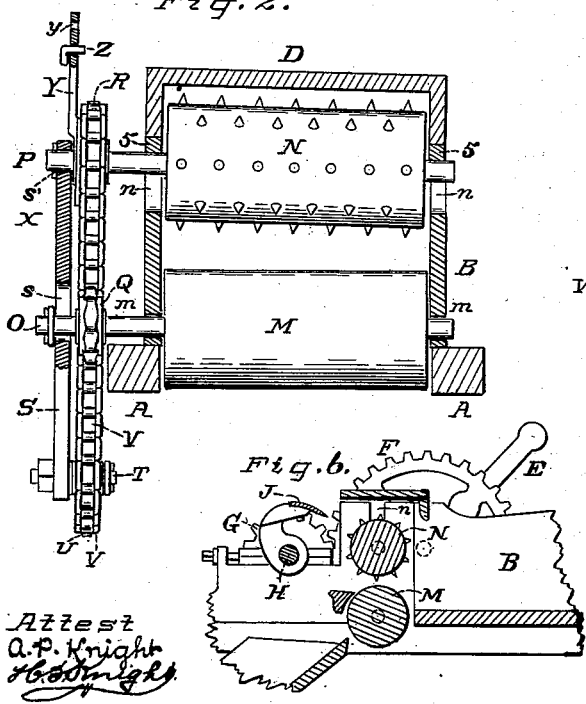
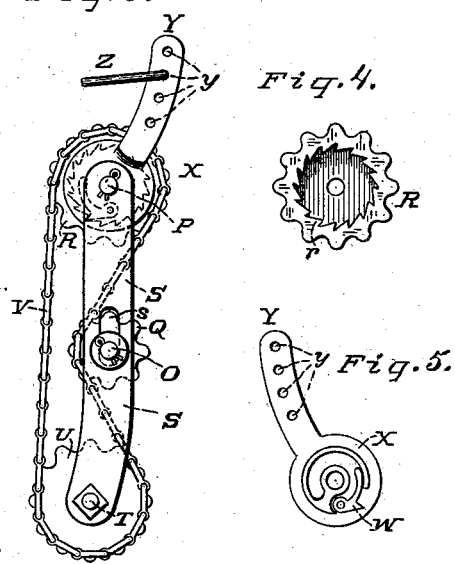
Attest
O. P. Knight
H. C. Knight
Inventor:
Jesse P. Outcalt
By Knight Bros.
Attys.

UNITED STATES PATENT OFFICE.

JESSE P. OUTCALT, OF LANCASTER, OHIO, ASSIGNOR TO THE EAGLE MACHINE COMPANY, OF SAME PLACE.

FEED-CUTTER.

SPECIFICATION forming part of Letters Patent No. 349,661, dated September 21, 1886.

Application filed July 12, 1886. Serial No. 207,800. (No model.)

*To all whom it may concern:*

Be it known that I, JESSE P. OUTCALT, of Lancaster, Fairfield county, Ohio, have invented a new and useful Improvement in Feed-Cutters, of which the following is a specification.

My present invention is an improvement in those feed mechanisms of feed-cutters in which the straw or other material to be cut is, in the intervals of effective action of the knife, fed forward a greater or less distance, according to whether a coarse or a fine cut is desired; and my invention is particularly directed to means whereby the feed mechanism is automatically adapted to the thickness, for the time being, of the mass of material passing forward to be cut, the continuity of the feed action at the same time remaining undisturbed.

In the accompanying drawings, Figure 1 is a perspective view of a fodder-cutter embodying my invention, part of the fly-wheel being broken away. Fig. 2 is a sectional view in the plane of the axes of the feed-rollers, the upper feed-roller being represented momentarily uplifted by the passage under it of material to be cut. Fig. 3 is a side elevation of the sprocket-wheels and yielding bearing-plate of the feed mechanism. Figs. 4 and 5 are elevations of the uppermost sprocket-wheel and of its actuating-pawl, respectively. Fig. 6 is a vertical section in the line of feed.

A may represent any suitable support for a customary feed-box, B, discharge-spout C, and covers D D'.

E represents the handle of a spur-wheel, F, which gears into a pinion, G, which is fastened to the shaft H of a rotating knife, J. The shaft H carries a fly-wheel, K, and a cam, L, which cam is preferably of the represented circular eccentric form.

The lower feed-roller, M, which may be a plain cylinder, as shown, revolves in stationary bearings $m$ in the sides of the trough. The upper feed-roller, (feed-roller proper,) N, revolves in vertical slots $n$ in the sides also, which, while preventing fore and aft displacement, permit an upward yield of said roller, as shown in Figs. 2 and 3, to allow passage of a greater or less thickness of material to be cut.

The shafts O P of the rollers M N are prolonged at one side of the machine, and have keyed fast to them sprocket-wheels Q R, beyond which they extend sufficiently to respectively occupy slot $s$ and circular orifice $s'$ in the yielding bearing-plate S, from whose lower part extends a horizontal stud, T, for a third sprocket-wheel, U, in alignment with sprocket-wheels Q and R. The sprocket-wheel Q is so connected by chain belt V with sprocket-wheels U and R as to rotate simultaneously but in opposite direction to said sprocket-wheels, than which it is of so much less diameter as to cause the smooth roller M to revolve more rapidly than the spiked roller N. Such diameter also facilitates free passage of the chain belt, as may be seen by reference to Figs. 1 and 3. Intermittent rotation is imparted to said sprocket-wheels and their attached feed-rollers by the following means: The sprocket-wheel R has an interior ratchet, $r$, which receives a gravitating pawl, W, upon a plate, X, which is sleeved upon shaft P, and whose arm Y has a series of orifices, $y$, for a rod, Z, whose other extremity occupies one of a series of orifices, 1, in an arm, 2, that extends from a yoke, 3, which vibrates about a fixed stud, 4, secured to a bracket, 6, on the frame. The vibrations of the yoke 3 are derived from the impingement against its inner edges of the rotating cam L. These vibrations can be made to produce a coarser or finer feed at will by adjustment of rod Z in orifices $y$ and 1.

The gravity of the feed-roller N and of its described appendages enables coaction of rollers M and N to nip and forward the material to the action of the cutter. The down stress of the roller N may be aided to any desired extent by springs 5, which bear downwardly on the shaft P.

Elevation of sprocket-wheel R incident to the passage of fodder under the roller N does not disturb the relations or functions of the chain belt, because the greater separation from sprocket-wheel Q of the sprocket-wheel R is exactly compensated for by the lessened distance of the sprocket-wheel U, and consequently the material is advanced with a uniform velocity, irrespective of its bulk.

The material to be cut is led through the trough B into contact with the cylinders M and N. The handle E is next grasped and the spur-wheel F rotated, thereby causing the pinion G, meshing therewith, to turn the shaft H, carrying the fly-wheel K, cutter J, and cam-wheel L. The yoke 3 is thus vibrated on the pivot 4, causing the rod Z to move back and forth, which vibrates the arm Y, carrying the pawl W, which engages the ratchet at each rearward movement of the arm and moves the sprocket-wheel R and its chain, sprocket-wheels, and cylinders intermittently to advance the feed (nipped by the cylinders) and deliver it to the cutter-blade.

I claim as new and of my invention—

1. The combination of roller M, its shaft O, journaled in stationary bearings $m$, the sprocket-wheel Q upon said shaft, the roller N, its shaft P, journaled in slotted bearings $n$, sprocket-wheel R upon said shaft, the slotted bearing-plate S, stud T, attached to said plate, the sprocket-wheel U upon said stud, and chain belt V, for operating the sprocket-wheels, substantially as described, for the purpose set forth.

2. The combination, with the feed-rollers M and N, the shafts O and P, and the sprocket-wheels Q and R, of the slotted bearing-plate S, the stud T, the sprocket-wheel U, the chain belt V, the pawl-and-ratchet mechanism $r$ W X Y, the rod Z, the yoke 3, the cutter-shaft, the driving-cam L upon the cutter-shaft, and means for rotating the shaft, substantially as set forth.

In testimony of which invention I hereunto set my hand.

JESSE P. OUTCALT.

Witnesses:
C. B. WHILEY,
D. A. ELLIOTT.